US006839937B2

(12) United States Patent
Miller

(10) Patent No.: US 6,839,937 B2
(45) Date of Patent: Jan. 11, 2005

(54) LEVELING SYSTEM

(75) Inventor: Joseph E. Miller, Naples, FL (US)

(73) Assignee: Bush Industries, Inc., Jamestown, NY (US)

(*) Notice: Subject to any disclaimer, the term of this patent is extended or adjusted under 35 U.S.C. 154(b) by 0 days.

(21) Appl. No.: 10/255,752

(22) Filed: Sep. 25, 2002

(65) Prior Publication Data

US 2004/0055107 A1 Mar. 25, 2004

(51) Int. Cl.[7] .............................................. B60B 33/06
(52) U.S. Cl. ...................... 16/32; 248/188.2; 248/188.4
(58) Field of Search .............................. 16/32, 33, 105, 16/19; 248/188.2, 188.3, 188.4; 312/249.1, 249.8, 9.45, 401

(56) References Cited

U.S. PATENT DOCUMENTS

| 824,525 | A | * | 6/1906 | Bonney | 248/188.4 |
|---|---|---|---|---|---|
| 1,480,588 | A | * | 1/1924 | Wise et al. | 16/19 |
| 1,810,971 | A | * | 6/1931 | Lee | 248/188.4 |
| 2,592,942 | A | * | 4/1952 | Moore | 248/184.1 |
| 3,436,045 | A | * | 4/1969 | Anspaugh | 410/46 |
| 3,858,270 | A | * | 1/1975 | Crowe | 16/19 |
| 4,364,148 | A | * | 12/1982 | McVicker | 16/32 |
| 4,752,156 | A | * | 6/1988 | Owens | 404/118 |
| 5,042,110 | A | * | 8/1991 | Orii | 16/32 |
| 5,046,387 | A | * | 9/1991 | Levake | 81/489 |
| 5,141,190 | A | * | 8/1992 | Wu | 248/188.4 |
| 5,332,182 | A | * | 7/1994 | Weisz et al. | 248/188.4 |
| 5,881,979 | A | * | 3/1999 | Rozier et al. | 248/188.5 |
| 6,268,573 | B1 | * | 7/2001 | Hartselle, III | 177/148 |
| 6,408,482 | B1 | * | 6/2002 | Henriott et al. | 16/29 |

FOREIGN PATENT DOCUMENTS

| JP | 410076804 A | * | 3/1998 |
|---|---|---|---|
| JP | 2000307254 A | * | 11/2000 |

* cited by examiner

Primary Examiner—Chuck Y. Mah
(74) Attorney, Agent, or Firm—Webb Ziesenheim Logsdon Orkin & Hanson, P.C.

(57) ABSTRACT

A leveling system for a containment unit is disclosed. This leveling system includes at least one and typically multiple leveling elements, each of which are adjustably attached to a surface of the containment unit. An adjustment mechanism is in communication with the leveling elements for displacing the leveling element or elements in a substantially vertical direction. The leveling system also includes a level measurement mechanism attached to a surface of the containment unit for indicating a containment unit horizontal planar position or indicating when the containment unit is "level." A containment unit is also disclosed.

18 Claims, 4 Drawing Sheets

LEVELING SYSTEM

BACKGROUND OF THE INVENTION

1. Field of the Invention

The present invention relates generally to systems for assisting in leveling an object and, in particular, to a leveling system for a containment unit, such as a piece of furniture.

2. Description of Related Art

Typically, when furniture or other objects are placed throughout a person's dwelling or work area, it is required and anticipated that the object be level. This is especially the case when the container or containment unit has unsteady, unbalanced or fragile objects placed thereon. In such cases, it is imperative that the containment unit be level with respect to the floor upon which it is placed, of course, assuming that the floor is also level. However, when the floor is also unlevel, the containment unit must then be level with respect to the standard horizontal plane.

It is common to have adjustable casters or legs on a containment unit, which allow a person to manually adjust the leg or legs in a vertical direction, whether upwards or downwards. Further, it is also known to use independently adjustable legs, so that the containment unit can be manipulated and assume a flat or horizontally level position.

Independent and adjustable legs or casters are often difficult to access. For example, since the legs or casters are typically on the bottom of the containment unit, one may often have to kneel down or even lie flat in order to reach under the containment unit and manually adjust the adjustable leg or caster. Obviously, such manual adjustment and difficult access pose serious drawbacks to the overall adjustability of the containment unit.

Another drawback is the person's ability to know just when the containment unit is level. In order to determine whether the containment unit is level, a person must then locate and/or purchase a level mechanism, place the mechanism in a central area or portion of the containment unit, and begin the adjustment process. This process typically involves adjusting a single leg or caster under the containment unit, standing up and then viewing the level mechanism, and continuing this process repeatedly until the containment unit is level. This may often be a tiresome and redundant process, involving an unnecessarily large amount of the person's time and energy.

SUMMARY OF THE INVENTION

Therefore, it is an object of the present invention to provide a leveling system for a containment unit that overcomes the deficiencies in the prior art as discussed above. It is another object of the present invention to provide a leveling system for a containment unit that provides improved access for manipulating an independent leveling element. It is yet another object of the present invention to provide a leveling system for a containment unit that includes a level measurement mechanism attached to a surface of the containment unit. It is a still further object of the present invention to provide a containment unit having a novel leveling system.

The present invention is a leveling system for a containment unit. This leveling system includes at least one and typically multiple leveling elements, each of which is adjustably attached to a wall or surface of the containment unit. An adjustment mechanism is in communication, typically mechanical communication, with the leveling elements, and displaces the leveling element or elements in a substantially vertical direction. The leveling system also includes a level measurement mechanism attached to a surface of the containment unit for indicating a containment unit horizontal planar position or indicating when the containment unit is "level." The leveling system is particularly useful in connection with cabinets, furniture, desk, audio-visual containment units, curios, closets, stands, shelving units and refrigerators. The present invention is also directed to a containment unit having a leveling system as hereinabove described.

The present invention, both as to its construction and its method of operation, together with the additional objects and advantages thereof, will best be understood from the following description of exemplary embodiments when read in connection with the accompanying drawings.

DETAILED DESCRIPTION OF THE PREFERRED EMBODIMENTS

Figure 1:
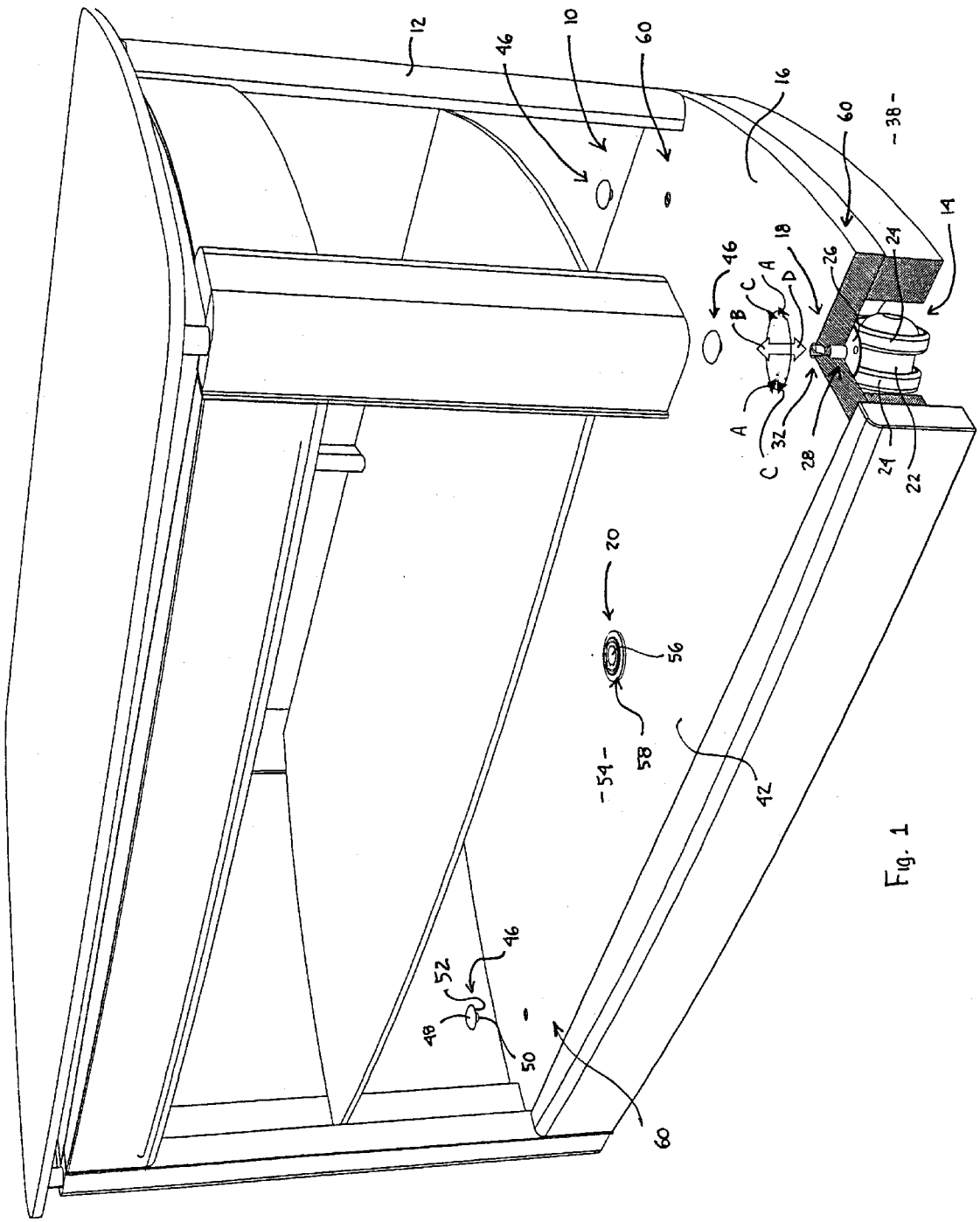
FIG. 1 is a perspective and partial sectional view of a leveling system for a containment unit according to the present invention.

For purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention is a leveling system 10 for use in connection with a containment unit 12, as illustrated in FIGS. 1–4. The leveling system 10 includes at least one leveling element 14 adjustably and moveably attached to a wall 16 of the containment unit 12. An adjustment mechanism 18 is in operative communication with the leveling element 14 and used to displace the leveling element 14 in a vertical direction, both upwards and downwards. Finally, the leveling system 10 also includes a level measurement mechanism 20 attached to a surface, and in a preferred embodiment, the wall 16 of the containment unit 12. The level measurement mechanism 20 is used to indicate a containment unit 12 horizontal planar position or that the containment unit 12 is "level." In a preferred embodiment, multiple leveling elements 14 are used and positioned on the containment unit 12 accordingly. Further, these leveling elements 14 are typically located on a bottom wall 16 or surface (typically the lowest horizontal surface) of the containment unit 12, and, in a preferred embodiment, the level measurement mechanism 20 is also located on or adjacent the bottom wall 16 or surface. However, it is envisioned that the leveling element 14 and the level measurement mechanism 20 can be positioned on or adjacent any surface of the containment unit 12.

Figure 2:
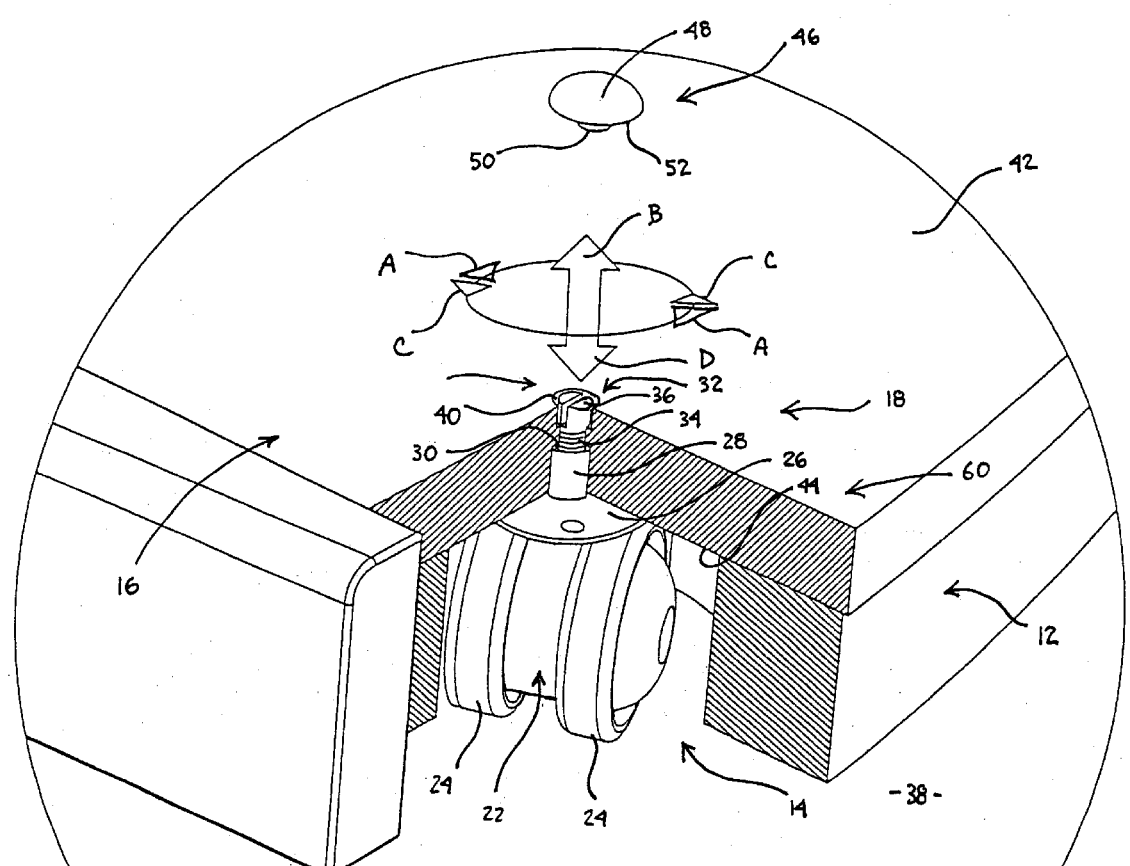
FIG. 2 is a magnified, perspective and partial sectional view of a leveling element and adjustment mechanism according to the leveling system of FIG. 1.

As best seen in FIG. 2, in a preferred embodiment, the leveling element is a caster element 22, which preferably includes at least one or possibly two wheel elements 24, both rotatable in a standard vertical plane. The use of these caster elements 22 in connection with the containment unit 12 adds the additional functionality of allowing a user to move and/or transport the containment unit 12. The caster element 22 may also be able to swivel in a standard horizontal plane, which allows greater flexibility in directional movement of the containment unit 12. The leveling element 14 may also be a simple leg or other stable structure for at least partially supporting the containment unit 12.

In the preferred embodiment the adjustment mechanism 18 includes a plate element 26 attached to the bottom wall 16 of the containment unit 12. An adjuster element 28 extends from the plate element 26 and includes an inner threaded bore 30. In this embodiment, the adjustment mechanism 18 also includes a screw element 32 having a threaded shaft portion 34 and a head portion 36. The threaded shaft portion 34 of the screw element 32 is sized and shaped so that it is capable of mating with the inner threaded bore 30 of the adjuster element 28. Further, the head portion 36 is configured to allow a user to rotate the screw element 32.

The screw element 32 is in operable communication with the leveling element 14. When the screw element 32 is rotated in a first direction (indicated as arrow A) the threaded shaft portion 34 engages the adjuster element 28 threaded bore portion 30, thereby urging the leveling element 14 in a first vertical direction (indicated by arrow B) away from the bottom wall 16 of the containment unit 12 (moving the plate element 26, and therefore containment unit 12, in an upwards direction). Accordingly, when the screw element 32 is rotated in a second direction (indicated by arrow C), the threaded shaft portion 34 engages the adjuster element 28 inner threaded bore 30 and urges the leveling element 14 in a second vertical direction (indicated by arrow D) towards the bottom wall 16 of the containment unit 12 (moving the plate element 26, and therefore the containment unit 12 in a downwards direction or towards a floor surface 38, upon which the containment unit 12 rests). Typically, the first direction of rotation, indicated by arrow A, is a clockwise rotation, while the second direction of rotation, indicated by arrow C, is a counterclockwise rotation. Generally, the cap element 46 is used to "hide" the adjustment mechanism 18, providing an additional aesthetic quality to the containment unit 12. The user may simply remove the cap element 46, adjust the leveling element 14 via the adjustment mechanism 18, and replace the cap element 46 over the containment unit orifice 40.

As seen in FIG. 2, the adjuster element 28 extends at least partially into a containment unit orifice 40, which extends through the bottom wall 16 of the containment unit 12. Specifically, the bottom wall 16 has an inner bottom wall surface 42 and an outer bottom wall surface 44. The leveling system 10 may also include a cap element 46 having a cap element head portion 48 and a cap element shaft portion 50. The cap element shaft portion 50 extends at least partially into the containment unit orifice 40 and the cap element head portion 48 has a head portion lower surface 52, which rests upon the inner bottom wall surface 42. This cap element 46 is used to cover the containment unit orifice 40 and the head portion 36 of the screw element 32.

The plate element 26 of the adjustment mechanism 18 is attached to the inner bottom wall surface 42 of the bottom wall 16. However, it is also envisioned that the plate element 26 may be attached to the outer bottom wall surface 44 of the bottom wall 16. In either embodiment, the plate element 26 must be rigidly attached to a surface and capable of supporting at least a portion of the weight of the containment unit 12.

Returning to FIG. 1, in a preferred embodiment, the head portion 36 of the screw element 32 is accessible by a user through an inside area 54 of the containment unit 12. This obviates the access problem experienced with prior art containment unit 12 leveling systems. Further, while the above-described adjustment mechanism 18 is a mechanical adjuster, any form of movement or drive is envisioned, such as motorized movement, pneumatic movement, etc.

The level measurement mechanism 20 includes a visual indication portion 56. This visual indication portion 56 is capable of visually displaying a horizontal containment unit planar position with respect to the floor surface 38 (or standard horizontal plane) upon which the containment unit 12 rests. The visual indication portion 56 may also include a central level marking (not shown), which would indicate that the horizontal surfaces of the containment unit 12, such as the bottom wall 16, are substantially parallel with the floor surface 38 (or standard horizontal plane) upon which the containment unit 12 rests. In a preferred embodiment, the level measurement mechanism 20 is positioned in a substantially central area or point on the bottom wall 16 of the containment unit 12. Still further, in another preferred embodiment, the containment unit 12 has a level measurement mechanism recess 58, and the level measurement mechanism 20 is positioned at least partially within this level measurement mechanism recess 58. This helps to "hide" or obscure the location and/or prominence of the level measurement mechanism 20. Further, in order to maximize effectiveness, the level measurement mechanism 20 is positioned in a substantially central point on the wall 16 of the containment unit 12. In addition, the level measurement mechanism 20 may be located on any horizontally planar surface of the containment unit 12. In a preferred embodiment, the level measurement mechanism 20 is a circular flash mount level (Model No. CPF 50), available from Level Development Ltd. of London, England.

As seen in FIGS. 1–4, the bottom wall 16 of the containment unit 12 includes a plurality of corner portions 60, typically four in the case of a substantially rectangular or square-shaped containment unit 12. In this embodiment, the leveling system 10 includes a respective number of leveling elements 14, and each of these leveling elements 14 is attached adjacent a respective corner portion 60 of the containment unit 12. However, it is also envisioned that multiple leveling elements 14 may be used in connection with a circular or other geometrically-shaped bottom wall 16 (not shown) of a containment unit 12. When using multiple leveling elements 14 it is also preferable to utilize multiple adjustment mechanisms 18, each adjustment mechanism 18 in communication with a respective leveling element 14.

Figure 3:
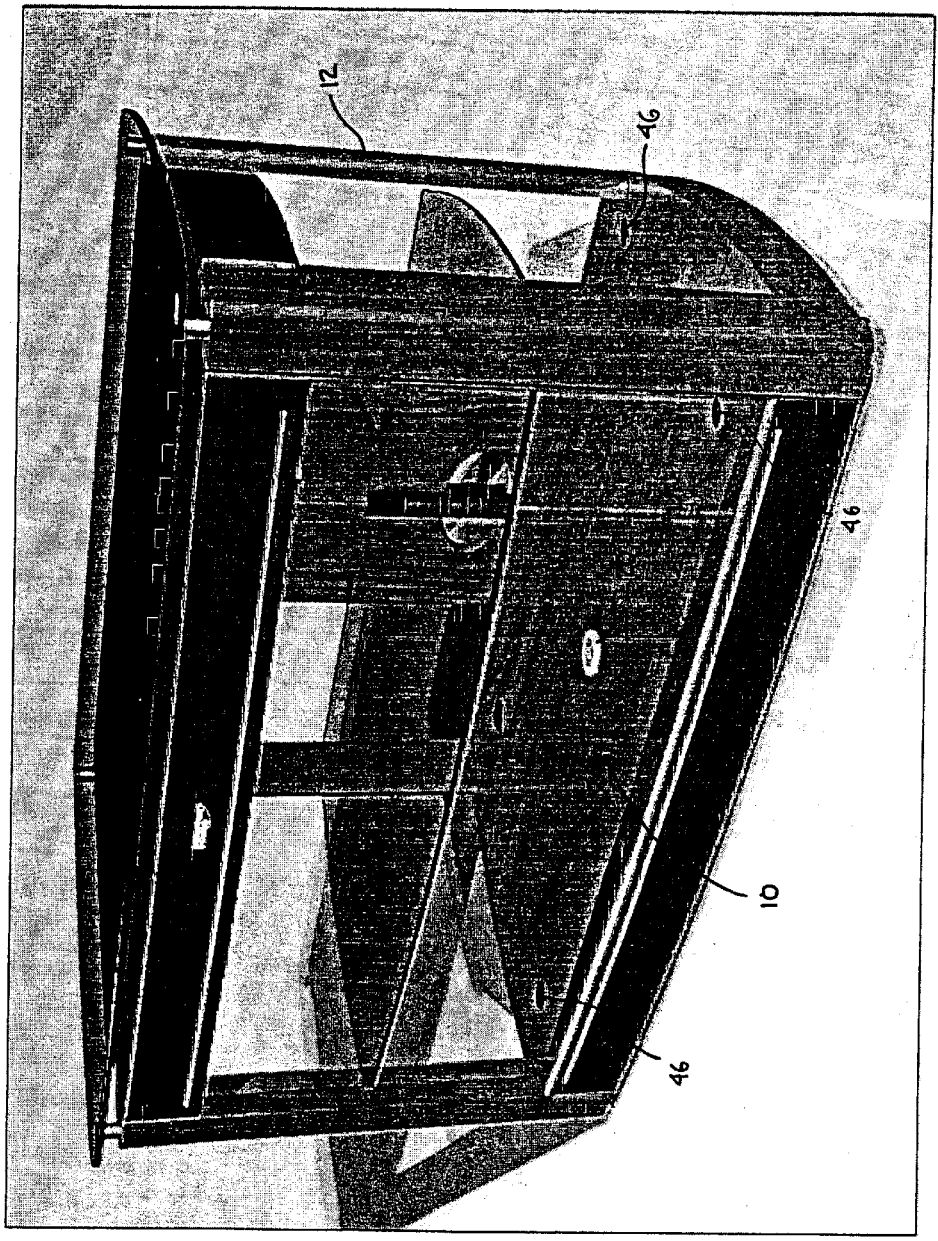
FIG. 3 is a perspective view of a video stand utilizing the leveling system according to the present invention.
Figure 4:
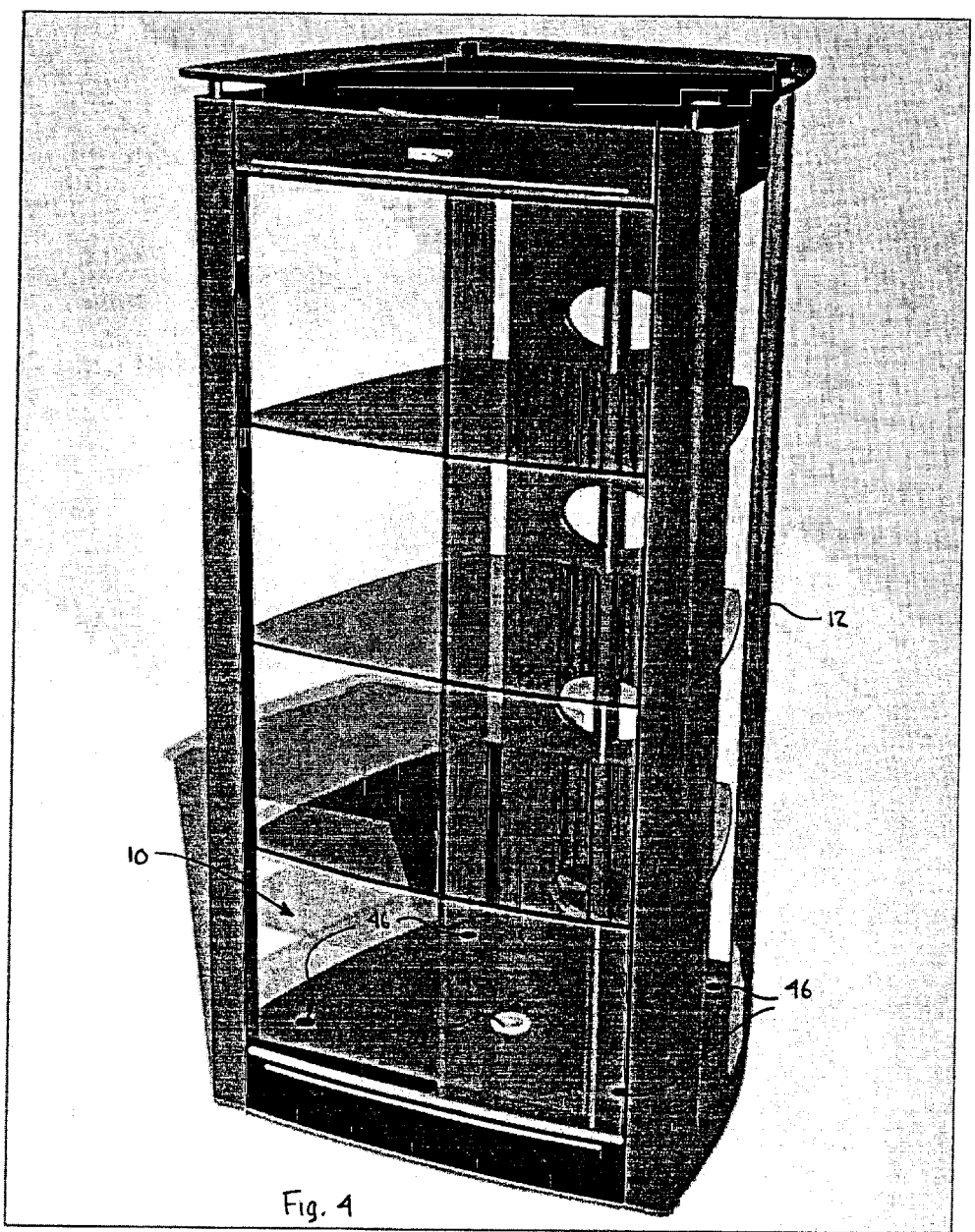
FIG. 4 is a perspective view of an audio tower utilizing the leveling system according to the present invention.

FIG. 3 illustrates the present leveling system 10 used in connection with a containment unit 12, where the containment unit 12 is a video stand. Further, FIG. 4 illustrates the present leveling system 10 used in connection with a containment unit 12, where the containment unit 12 is an audio tower. While it has been demonstrated that the leveling system 10 can be used in connection with these specific containment units 12, it is obvious that this leveling system 10 can be used in connection with cabinets, furniture, desk, audio-visual containment units, curios, closets, stands, shelving units, refrigerators, etc.

Overall, the present invention is a leveling system 10 that can be used with a variety of different containment units 12. The leveling system 10 is easily accessible through the inside area 54 of the containment unit 12, thereby making it unnecessary to reach under and attempt to manipulate a leveling element 14 in difficult-to-access or obscured areas. Also, in providing a level measurement mechanism 20 with each containment unit 12, the "level" status of the containment unit 12 is easily monitored and adjusted.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A leveling system for a containment unit, comprising:
    at least one leveling element adjustably attached to a wall of the containment unit;
    an adjustment mechanism in communication with the at least one leveling element and configured to displace the at least one leveling element in a substantially vertical direction; and
    a level measurement mechanism attached to a surface of the containment unit and configured to indicate a containment unit horizontal planar position;
    wherein the adjustment mechanism comprises:
    a plate element attached to a bottom wall of the containment unit;
    an adjuster element extending from the plate element and having an inner threaded bore; and
    a screw element having a threaded shaft portion and a head portion;
    wherein the threaded shaft portion is configured to mate with the inner threaded bore of the adjuster element and wherein the head portion is configured to allow the screw element to be rotated.

2. The leveling system of claim 1, wherein the at least one leveling element is a caster element having at least one wheel element rotatable in a substantially vertical plane.

3. The leveling system of claim 2, wherein the caster element is configured to swivel in a substantially horizontal plane.

4. The leveling system of claim 1, wherein the adjuster element extends at least partially into a containment unit orifice extending through the bottom wall of the containment unit.

5. The leveling system of claim 4, wherein the bottom wall has an inner bottom wall surface and an outer bottom wall surface, the leveling system further comprising a cap element having a head portion and a shaft portion, the shaft portion configured to at least partially extend into the containment unit orifice, the head portion having a head portion lower surface configured to rest upon the inner bottom wall surface.

6. The leveling system of claim 1, wherein the screw element is in communication with the leveling element, whereby (i) when the screw element is rotated in a first direction, the threaded shaft portion engages the adjuster element threaded bore portion, urging the leveling element in a first vertical direction away from the bottom surface of the containment unit; and (ii) when the screw element is rotated in a second direction, the threaded shaft portion engages the adjuster element threaded bore portion, urging the leveling element in a second vertical direction towards the a surface upon which the containment unit rests.

7. The leveling system of claim 1, wherein the bottom wall has an inner bottom wall surface and an outer bottom wall surface, the plate element attached to at least one of the inner bottom wall surface and the outer bottom wall surface.

8. The leveling system of claim 1, wherein the head portion of the screw element is accessible by a user through an inside area of the containment unit.

9. The leveling system of claim 1, wherein the level measurement mechanism includes a visual indication portion capable of visually displaying a horizontal containment unit planar position.

10. The leveling system of claim 9, wherein the visual indication portion includes at least a central level marking indicating that the surface of the containment unit is substantially parallel with one of a surface upon which the containment unit rests and a standard horizontal plane.

11. The leveling system of claim 1, wherein the level measurement mechanism is positioned in a substantially central point on the surface of the containment unit.

12. The leveling system of claim 11, wherein the surface of the containment unit is a bottom wall having an inner bottom wall surface and an outer bottom wail surface.

13. The leveling system of claim 11, further comprising a level measurement mechanism recess, the level measurement mechanism positioned at least partially within the level measurement mechanism recess.

14. The leveling system of claim 1, wherein the wall of the containment unit has a plurality of corner portions, the leveling system comprising a plurality of leveling elements, each of the plurality of leveling elements attached adjacent a respective corner portion of the containment unit.

15. The leveling system of claim 14, wherein at least one of the plurality of leveling elements has an adjustment mechanism in communication therewith.

16. The leveling system of claim 1, wherein the containment unit is one of a cabinet, a furniture piece, a desk, an audio-visual containment unit, a curio, a closet, a stand, a shelving unit and a refrigerator.

17. A containment unit having a bottom wall, comprising:
    at least one leveling element adjustably attached to the bottom wall;
    an adjustment mechanism in communication with the at least one leveling element and configured to displace the at least one leveling element in a substantially vertical direction; and
    a level measurement mechanism attached to a surface of the containment unit and configured to indicate a containment unit horizontal planar position;
    wherein the adjustment mechanism comprises:
    a plate element attached to a bottom wall of the containment unit;
    an adjuster element extending from the olate clement and having an inner threaded bore; and
    a screw element having a threaded shaft portion and a head portion;
    wherein the threaded shaft portion is configured to mate with the inner threaded bore of the adjust element and wherein the head portion is configured to allow the screw element to be rotated.

18. The containment unit of claim 17, wherein the at least one leveling element is a caster element having at least one wheel element rotatable in a substantially vertical plane and configured to swivel in a substantially horizontal plane.

* * * * *

UNITED STATES PATENT AND TRADEMARK OFFICE
CERTIFICATE OF CORRECTION

PATENT NO. : 6,839,937 B2
DATED : January 11, 2005
INVENTOR(S) : Miller

It is certified that error appears in the above-identified patent and that said Letters Patent is hereby corrected as shown below:

Column 6,
Line 22, "bottom wail" should read -- bottom wall --
Line 53, "olate clement" should read -- plate element --

Signed and Sealed this

Twenty-eighth Day of June, 2005

JON W. DUDAS
*Director of the United States Patent and Trademark Office*